(12) United States Patent
Mosman

(10) Patent No.: US 8,757,524 B2
(45) Date of Patent: Jun. 24, 2014

(54) METHOD AND APPARATUS FOR TRIMMING BUDS AND FLOWERS

(76) Inventor: Donald Mosman, Nevada City, CA (US)

(*) Notice: Subject to any disclaimer, the term of this patent is extended or adjusted under 35 U.S.C. 154(b) by 225 days.

(21) Appl. No.: 13/067,073

(22) Filed: May 4, 2011

(65) Prior Publication Data
US 2012/0279193 A1    Nov. 8, 2012

(51) Int. Cl.
*B02C 25/00* (2006.01)
(52) U.S. Cl.
USPC ............ 241/30; 241/60; 241/74; 241/81; 241/166; 241/167; 241/235
(58) Field of Classification Search
USPC ............ 241/30, 60, 74, 81, 166, 167, 235; 99/567, 585, 605, 635, 636, 637, 639
See application file for complete search history.

(56) References Cited

U.S. PATENT DOCUMENTS

| | | | | |
|---|---|---|---|---|
| 1,256,492 A | * | 2/1918 | Urschel | 99/636 |
| 1,336,991 A | * | 4/1920 | Urschel | 99/636 |
| 1,381,510 A | * | 6/1921 | Sells | 99/567 |
| 2,114,730 A | * | 4/1938 | Urschel | 99/636 |
| 2,393,461 A | * | 1/1946 | Finley | 99/636 |
| 3,010,498 A | * | 11/1961 | Carlson | 99/636 |
| 3,871,723 A | * | 3/1975 | Pray | 384/495 |
| 4,043,036 A | * | 8/1977 | Stevens et al. | 30/43.6 |
| 4,167,975 A | * | 9/1979 | Fahrenholz | 171/12 |
| 4,736,896 A | * | 4/1988 | Wagner | 241/82.6 |
| 7,028,844 B2 | * | 4/2006 | Nelson | 209/135 |
| 7,121,071 B2 | * | 10/2006 | Berkeley | 56/202 |
| 7,168,643 B2 | * | 1/2007 | Mercier | 241/169.1 |
| 2007/0069056 A1 | * | 3/2007 | Shouse et al. | 241/277 |
| 2007/0095216 A1 | * | 5/2007 | Zittel et al. | 99/636 |

FOREIGN PATENT DOCUMENTS

EP    0004143 B1    1/1982

* cited by examiner

*Primary Examiner* — Faye Francis
*Assistant Examiner* — Leonel Vasquez

(57) ABSTRACT

The present invention is an apparatus for trimming plants, in particular, buds and flowers, to remove unwanted plant material. A typical application would be to process a plant to leave only trimmed buds and flowers for use in potpourri, fragrant sashes, or as a prelude to further processing of essential oils. The apparatus employs a combination of a slotted metal drum and a lawn mower type cutting reel that are rotated in the same direction, but at different speeds, to create a cutting interface that shears off the unwanted plant material. The apparatus further employs a vacuum manifold to collect the debris and transfer it into a waste collection device.

14 Claims, 16 Drawing Sheets

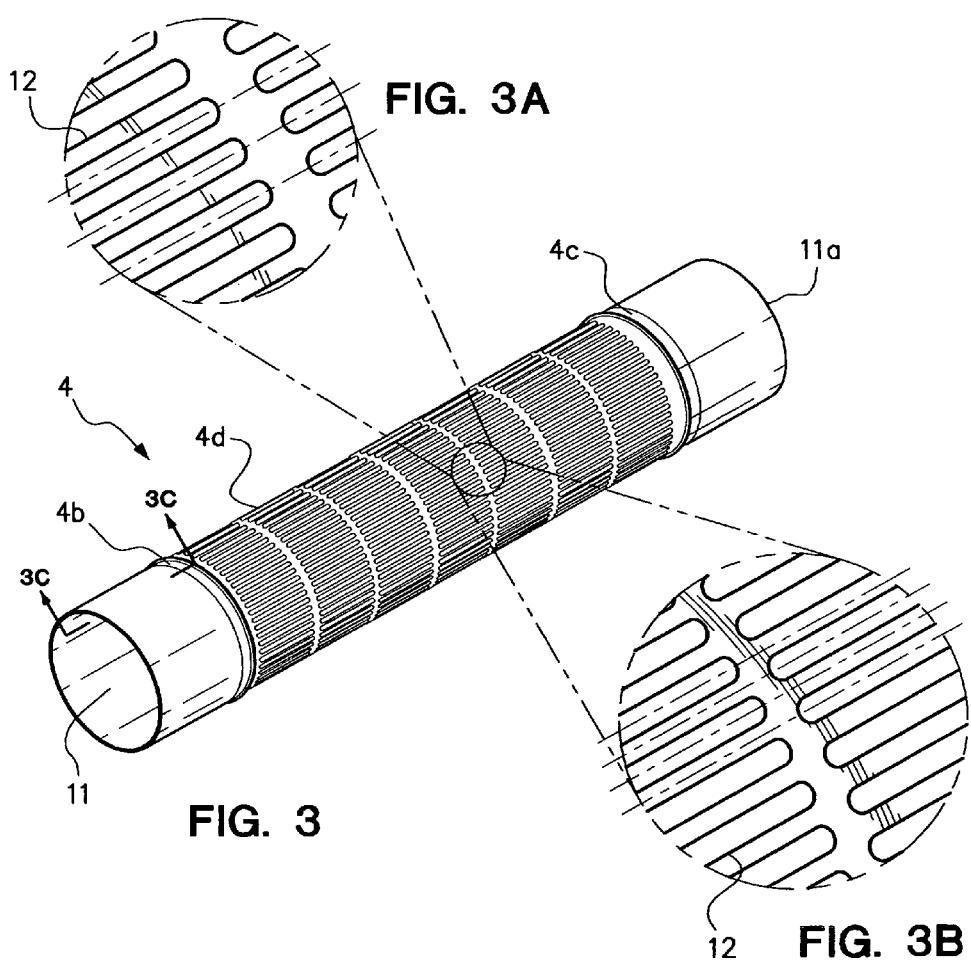
FIG. 3A
FIG. 3
FIG. 3B
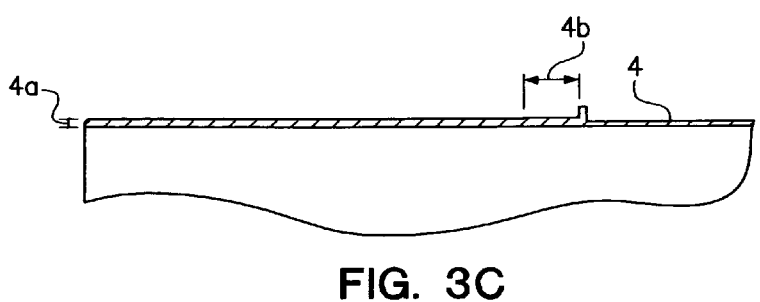
FIG. 3C

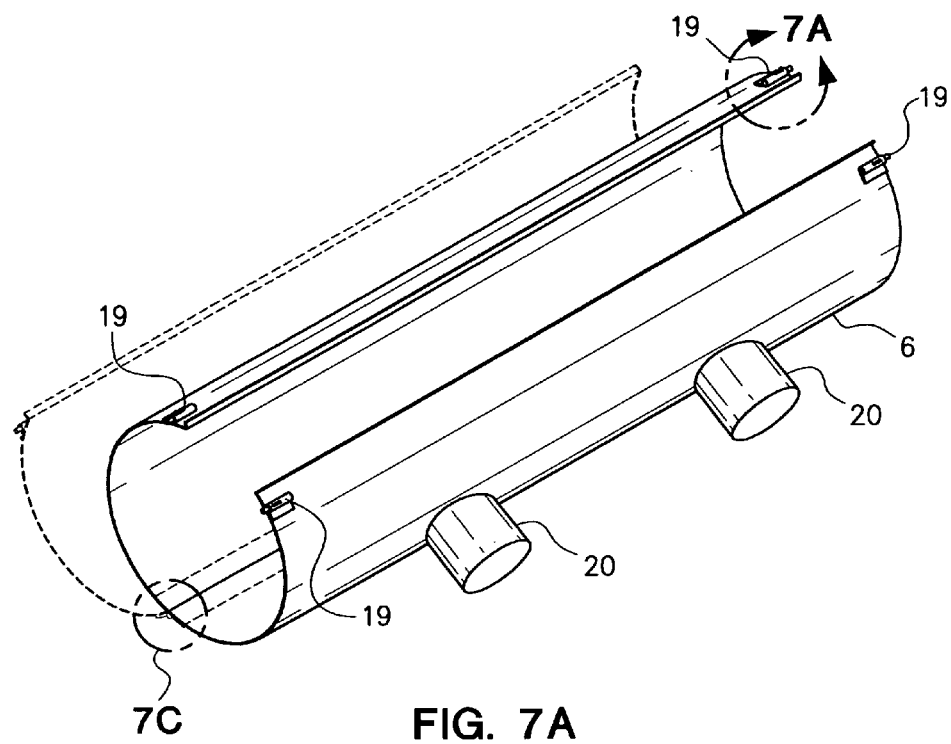
FIG. 7A
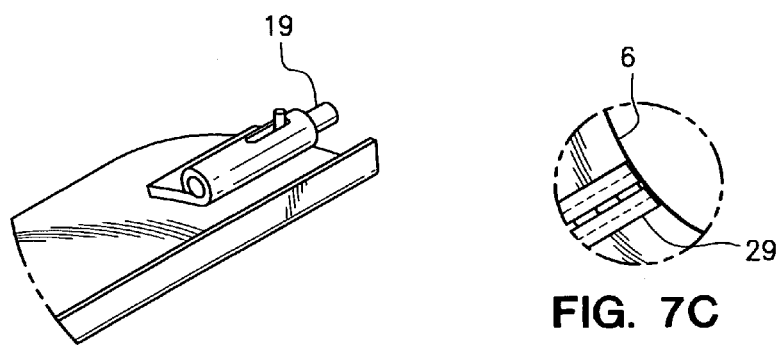
FIG. 7B
FIG. 7C

METHOD AND APPARATUS FOR TRIMMING BUDS AND FLOWERS

CROSS-REFERENCE TO RELATED APPLICATION

Not Applicable

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

This invention pertains to the trimming of plants, and in particular to the trimming of plant buds and flowers.

2. Description of the Background Art

There are a multitude of machines and methods for cutting, chipping, trimming, and grinding plant materials for a variety of purposes such as for gardening, making wood products, food processing, agriculture, and composting. Although there are a number of prior art apparatuses in these related fields, there are only a couple of apparatuses that are sufficiently related in purpose and/or design to that of the present invention to bear detailed discussion.

One such prior art apparatus as described in U.S. Pat. No. 7,168,643 (Mercier) describes a leaf snatcher for taking leaves and other small plant debris and putting this material into a waste container. This apparatus, which is specifically designed for yard cleanup of leaves and small plant debris, uses a round, horizontal grate with a rotating cutting blade underneath designed to create a vacuum to pull the plant material through the grate into a waste receptacle underneath. This machine is designed for coarse cutting and suction of the material and not for careful trimming of the plant material so that it can be effectively used for the preparation of potpourri, catnip, and other decorative or olfactory products. This apparatus is similar in design concept and purpose to European Patent Application No. 0004144A1 (Peck).

A very similar apparatus to that disclosed in the above-mentioned Mercier patent is published U.S. Patent Application No. 2007/0069056A1 (Shouse, et al). This application describes an apparatus and method for trimming flowers and related plant material to make such things as potpourri, catnip, and other decorative or olfactory products. The apparatus, which was intended for trimming flowers, uses a simple round, horizontal grating located just above a horizontal rotating blade as disclosed in the Mercier patent to trim off unwanted parts of a flower (or other parts of a plant) that extend through the grating and are sheared by the rotating blade. The purpose of the machine is to reduce the amount of hand cutting of flowers and related plant parts, thereby lowering the cost of production. However, as pointed out in its specification, the flowers or other plant parts must still be "rolled on the machine" (i.e, around the top side of the grating) by hand. The specification admits that the machine only "reduces" the amount of labor formerly needed to perform this task.

Another example is set out in U.S. Pat. No. 7,028,844 (Nelson) which describes a specialized machine for processing dried lavender. This apparatus utilizes two vertically oriented opposing belt rollers that are placed nearly parallel to each other to form a moving wedge-shaped conveyor that take hold of the lavender and move it into an ever decreasing space between the belts. The process of crushing the lavender between the wedged belts results in the flower buds (which results mostly in chaff) separating from the stems and falling to a collection bin below the belts. At the end of the belt system, the stems and other debris are pushed out through a slot into a collection basket as waste product. The use of this apparatus has a number of drawbacks: it still requires significant hand labor to insert the lavender which must then be hand-inserted into the apparatus from the open top side in a manner that avoids jamming or overflowing of the wedge belt design. Moreover, there is consideration damage to the flower buds resulting in the creation of significant amounts of chaff and debris that must be further separated and portions collected as dust that must be discarded.

As shown above with the state of the existing art, there is still considerable hand labor required for trimming plant buds and flowers.

Perhaps even more importantly, the finished quality of flower buds is not easily controllable and desired portions of flower buds are often crushed and/or cut away. For certain types of finished products, this is a serious drawback and is the reason that most plant processing of this type is still done with hand cutting.

The above described inventions can only operate with dry plant material and can become clogged or gummed up when the particular type of plant being processed has greater amounts of natural surface oils on its stems, leaves, and flowers.

Finally, the aforementioned inventions pose a hazard for the operator or the operator's clothing because the operator has to place the leaves on the respective grill, thereby creating a possibility that hair, a piece of clothing or a small appendage (e.g., a child or animal) could get caught in the apparatus.

All of the above negative factors add to the cost of production and to non-optimal product quality and safety issues for the operator. Consequently, there is a need in this field of art for an apparatus that is less labor intensive, has superior controllability of the end-product quality, can operate with plants with varying degrees of oils, and has significantly improved safety for the operator.

SUMMARY OF THE INVENTION

The present invention answers the need in the field for a better apparatus and method by utilizing a combination of novel mechanical designs.

According to one preferred aspect of the invention, there is provided a cutting interface comprising a slotted drum and cutting reel which are located parallel to each other and in very close proximity (typically 0.002" to 0.006"). The slotted drum is mounted with precision bearings on both of its ends and is rotated by means of an electric motor and timing belt. The cutting reel is likewise mounted with precision bearings on both of its ends and is rotated in the same direction as the slotted drum but at a much higher speed. The cutting reel comprises multiple curved blades (typically in a "lawn mower" type configuration of eight blades, with each blade having 90 degrees of rotation from one end of the cutting reel to the other), so that the cutting interface can act in the manner of a shear when a point on one of the blades of the rotating cutting reel comes closest to a point on the edge of a slot in the differentially rotating slotted drum (i.e, at a tangent point), and so that a cutting point on an individual blade on the cutting reel moves from one end of the slotted drum to the other end in a straight line, which is hereafter referred to as the tangent cutting line. The tangent cutting line typically is located approximately 12 degrees offset from the physical bottom of the slotted drum.

According to another aspect of the invention, there is provided a cleaning system for the slotted drum comprising a roller cleaning brush that runs parallel to the slotted drum and touches it lengthwise so as to wipe off physical debris and fluids from the plant material left over from the shearing done along the cutting interface. The roller brush is adjustable as to the amount of pressure applied against the slotted drum. The slotted drum cleaning system further comprises a series of sprayers mounted on a tube which is positioned overhead and parallel to the slotted drum, with the sprayers being pointed towards the slotted drum and spaced so as to provide a full spray coverage of the slotted drum as it rotates. The sprayer system typically employs water as the cleaning fluid.

According to another aspect of the invention, there is provided a vacuum manifold for extracting the plant material that is cut off by the apparatus as waste. The vacuum manifold system is fitted around the cutting reel, except for a small part of the cutting reel circumference which forms a linear aperture where the cutting interface resides. The vacuum manifold is hinged across its length and held in place by spring loaded pins to facilitate easy removal for cleaning and/or sharpening of the cutting reel blades.

According to another aspect of the invention, there is provided a metal frame with front and back end plates for holding the cutting interface and the cleaning system in a horizontal position. The metal frame is constructed to have the ability to be level or lower on the side of the cutting interface that outputs plant material such that, when that side is lowered, gravity assists the flow of the plant material through the slotted drum so that the operator will have minimal work to keep the flow of plant material going through the apparatus.

According to another aspect of the invention, there is provided a pair of adjustable bearing mounts for the cutting reel, with one adjustable bearing mount being mounted on the front frame plate and the second adjustable bearing mount being mounted on the rear frame plate with the adjustable bearing mounts holding the cutting real at each end. The adjustable bearing mounts are made with a small offset from their centers so that placement of the bearings for holding the cutting reel can adjust the distance of ends of the cutting reel blades from the surface of the slotted drum. The adjustable bearing mounts are held in place by means of a rotatable clamp on the opposite side of both the front and rear frame end plates and are capable of being un-clamped, rotated, and then re-clamped for the purpose of causing the slightly offset bearing to be closer to, or further from, the centerline of the slotted drum, thereby allowing for the adjustment of the cutting interface (i.e., the distance) between the slotted drum and the cutting reel (typically varying from 0.002" to 0.006").

Embodiments of the invention provide a slotted drum into which the plant material is loaded on one end and from which the processed plant material exits from the other end as a result of the combination of the rotating motion of the slotted drum, the movement of the shearing (tangent) point along the tangent cutting line that runs from one end of the slotted drum to the other end of the slotted drum, and/or the effect of gravity created when the metal frame is lowered to a less than horizontal position on the output end. The slotted drum is configured from by a single metal tube that contains horizontal rows of slots around its periphery. The slotted drum is rotated by means of an electric motor that drives a timing belt that is fitted about a timing belt pulley mounted on one end of the slotted drum. The typical embodiment of the slotted drum comprises a 0.120" thick wall machined steel tube with horizontal rows of approximately 0.312" wide slots that are approximately 4" in length, with seven slots per horizontal row. However, the slotted drum can be implemented with other metals, different thicknesses, row spacings, slot lengths and widths, and means of being rotated (such as a roller or V-belt drive) as an embodiment of the invention.

Compared to existing open, horizontal, flat grate designs or the dual converging belt design, the slotted drum embodiment provides a much more gentle and effective means for having only the undesired portions of the plant (such as outer portions of leaves, stems, thorns, etc.) put into the cutting interface, thereby reducing waste and creating a higher quality of finish trimming to the flower, bud or other portion of the plant which is desired as an end product. The slotted drum also provides a safer method for processing the plant material because the human operator only has to place the plant material into the input end of the slotted drum, thereby keeping the operator's hands and clothing away from the cutting interface.

Embodiments of the invention provide a cutting reel that is mounted with bearings having an adjustable position on both its ends such that the cutting real is adjusted to be parallel to the slotted drum with only a small gap of typically 0.002 to 0.006 inches. The cutting reel is rotated by means of an electric motor that drives a timing belt that is fitted about a timing belt pulley or mounted on one end of the cutting reel. A timing belt is a preferred means because such a coupling militates against slippage. However, there is typically no timing function implemented by such belts and other means for the cutting reel being rotated (such as a roller or V-belt drive or chain) can be implemented. The cutting reel is typically a multi-blade configuration (e.g., eight blades) with each blade typically having 90 degrees of rotation from one end of the cutting reel to the other end. This is often referred to as a "lawn mover" style cutting reel. However, a single blade and/or a different degree of rotation of the blade(s) from end to end can be employed. The cutting reel is typically made from a steel alloy, but other metals can be used, provided that they provide sufficient stiffness to keep the cutting interface narrow across the entire cutting tangent and hard enough to keep a sharp edge for a reasonable period of cutting time. For example, certain stainless steels, aluminum alloys, or even titanium could be employed. However, these metals are generally more expensive and/or more difficult to machine, and therefore, are not preferred.

Compared to the existing single horizontal fixed or rotating blade or a dual converging belt designs, the cutting reel embodiment provides a much more robust cutting interface that produces less waste and a higher quality of finish trimming to the flower, bud or other portion of the plant desired as an end product. It also creates a much safer apparatus because the cutting interface is near the bottom of the slotted drum, and inside a protective cover, so it is less likely that a human operator can be injured unless a hand is intentionally inserted into the slotted drum and the fingers pressed through a slot.

Embodiments of the invention utilize a novel vacuum manifold that completely encloses the cutting reel for safety and for a better vacuum effect to remove plant waste. The manifold is made with a hinge and is held in place with spring-loaded pins so that it is easy to remove it for cleaning and for sharpening of the cutting reel.

Compared to the existing art in the field, the spring pinned, hinged vacuum manifold embodiment provides a much tighter vacuum chamber. It also enables a simpler procedure for opening and removing the slotted drum and the cutting reel, in particular, for such purposes as cleaning and sharpening of the cutting and other surfaces.

Embodiments of the invention employ a metal frame that holds the cutting interface and the cleaning system in a horizontal position. Alternately, the metal frame is made so that there is the ability to operate the apparatus not only in a level position but also on a downward slope to utilize gravity to assist to the flow of the plant material through the slotted drum so that the operator will have minimal effort in keeping the flow of plant material going through the apparatus.

Compared to the existing art in the field, the metal frame that can be operated horizontally or lowered on one end, allows the use of gravity to assist the flow of plant material through the slotted drum while being processed and provides an improved means for enabling the flow and processing of plant material through the apparatus.

Embodiments of the invention employ an adjustable bearing mount mechanism for the cutting reel that permits more precise adjustment of the cutting interface to enhance the shearing force on the plant material, thereby resulting in the plant material being cleanly shorn rather than torn or crushed, with the consequence that the amount of wasted chaff is reduced, and the buildup of debris on the cutting edges is minimized, while making it is easier to clean the apparatus.

Compared to the existing art in the field, the front and rear adjustable bearing mounts for the cutting reel enable the cutting interface between the cutting reel and the slotted drum to be tailored or optimized for handling different plant materials.

The object of embodiments of the invention is to provide an apparatus and method to process plant material, in particular to the trimming of plant buds and flowers. Further details of embodiments of the invention will be described in the following portions of the specification, wherein the description is for the purpose of fully disclosing preferred embodiments of the invention without placing any limitations thereon, and are for illustrative purposes only.

BRIEF DESCRIPTION OF THE DRAWINGS

Examples of embodiments of the invention will now be described with reference to the following drawings, in which:

FIG. 3 is an isometric, perspective view of the slotted drum embodiment showing two exemplary configurations of the slotting, the bearing surfaces on each end of the slotted drum, and the thickness of the drum.

FIG. 3A and FIG. 3B are two exemplary configurations of the possible slotting in the slotted drum, with FIG. 3A showing the slotting being in-line and FIG. 3B showing the slotting being offset.

FIG. 3C is a detailed, side view of the bearing surfaces on the slotted drum.

FIG. 7A is an isometric, perspective view of the vacuum manifold embodiment showing the location of the hinge and a dotted line representation of the hinged portion of the manifold in an open position, pulled away from the cutting reel.

FIG. 7B is an isometric, perspective exploded view of the spring loaded mounting pins on the vacuum manifold used to hold it in place.

FIG. 7C is an isometric, perspective exploded view of the hinge on the vacuum manifold.

DESCRIPTION OF EMBODIMENTS

Figure 1:
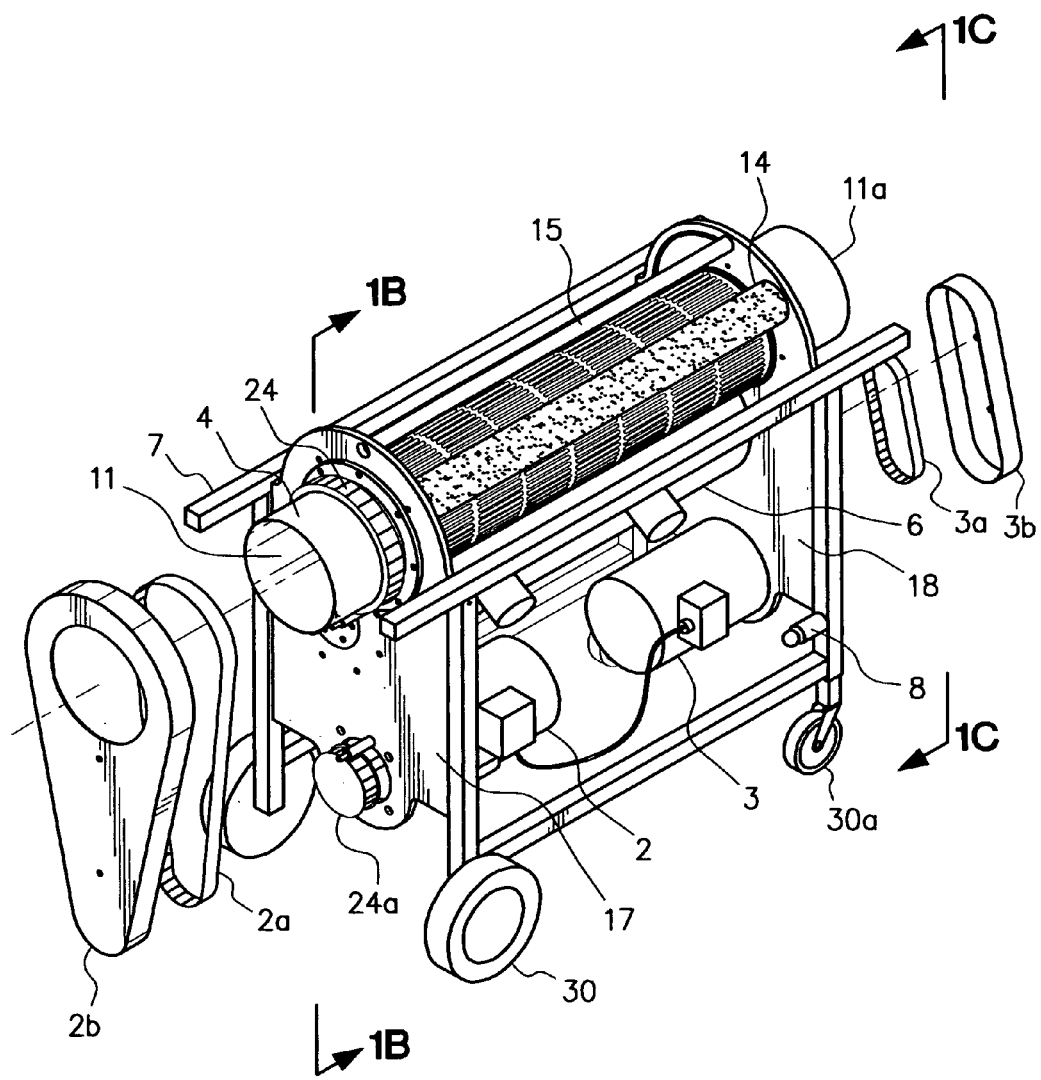
FIG. 1 is an isometric, perspective view with exploded representation showing an embodiment of the overall apparatus and its main parts.
Figure 1A:
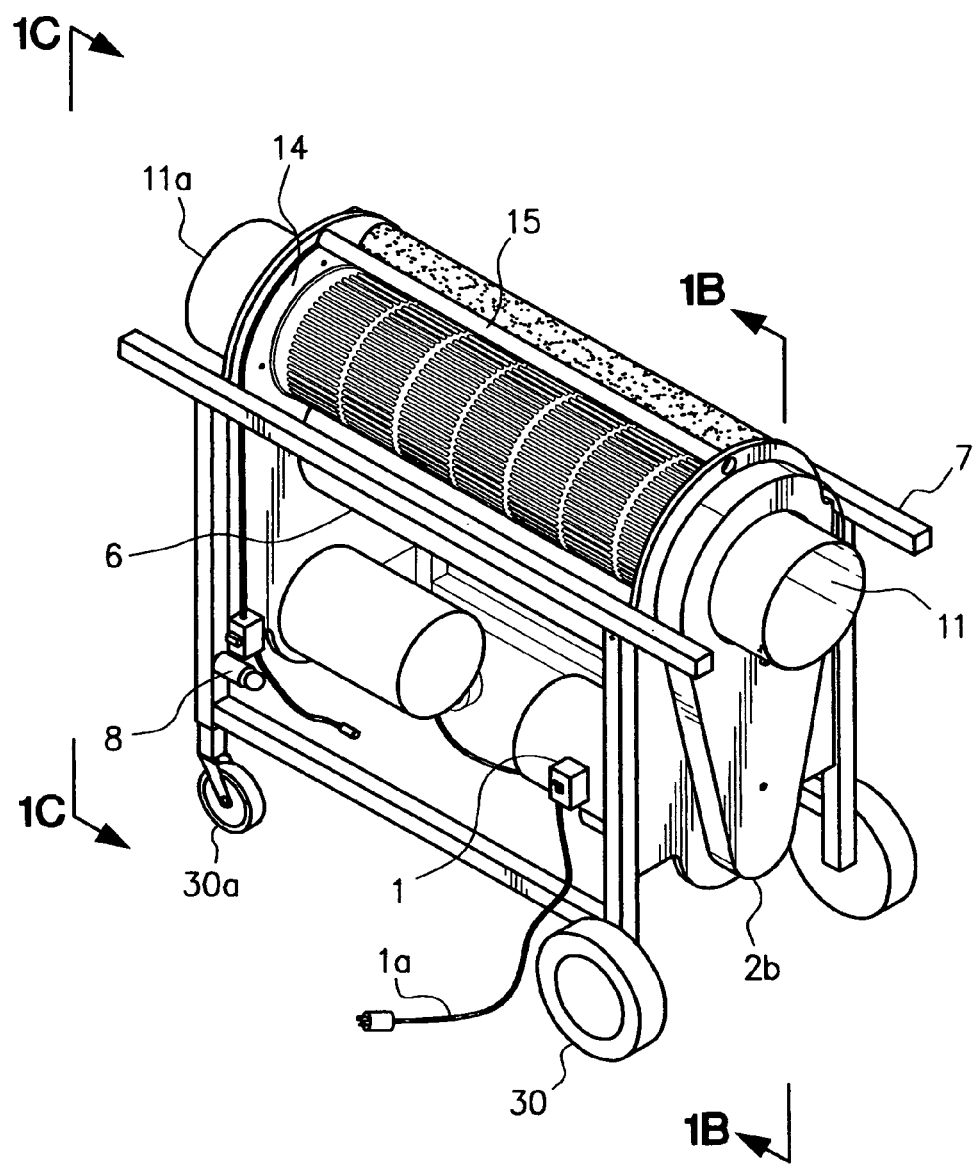
FIG. 1A is an isometric, perspective view showing an embodiment of the overall apparatus and its main parts from the side opposite to that shown in FIG. 1.

Referring more specifically to the drawings, for illustrative purposes the present invention is embodied in the apparatus generally shown in FIG. 1 through FIG. 11D.

The example of a slotted drum 4 in FIG. 3 through FIG. 3C shows a ⅛ inch thick tube 4a that has ground bearing surfaces 4b and 4c on either end and has horizontal rows 4d with seven slots 12 that are 5/16 inches wide by 4 inches long and that can be differently aligned as shown in FIG. 3A and FIG. 3B.

However, one skilled in the art would appreciate that similar slotted drums with a different number of slots per horizontal row and/or with slots of different widths and lengths and/or a drum of a different thickness could be used.

Figure 4:
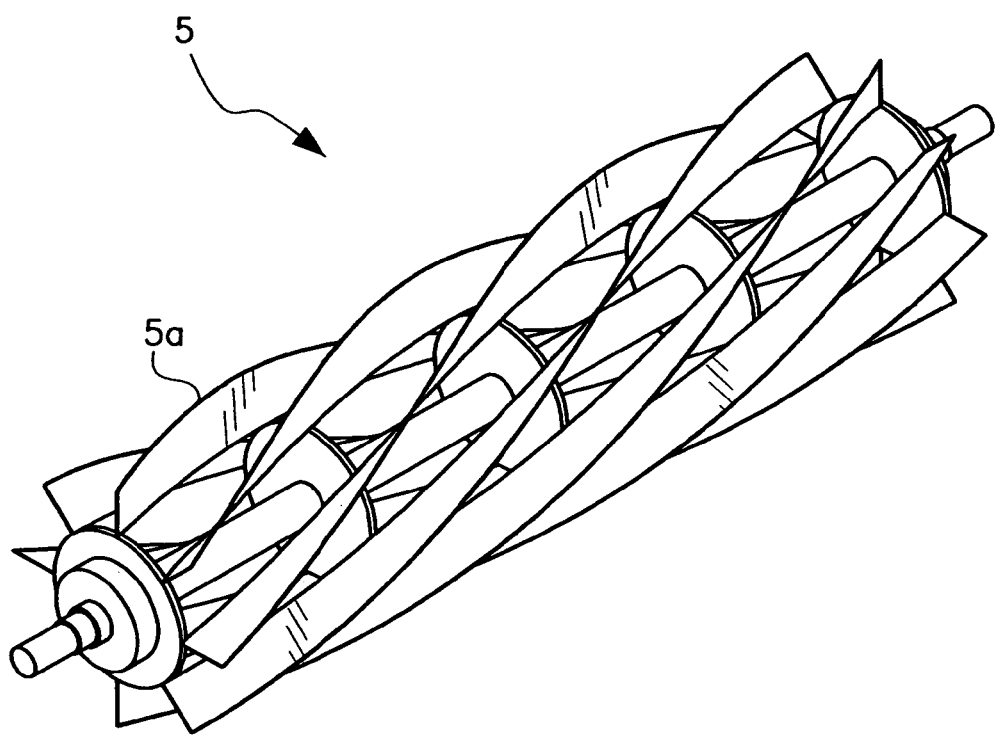
FIG. 4 is an isometric, perspective view of the cutting reel embodiment showing the multiple blades (eight) and 90 degrees of blade rotation from end to end of the cutting reel.

The example of a cutting reel 5 in FIG. 4 shows a "lawn mower" type of cutter with eight blades 5a with 90 degrees of end to end blade rotation. However, one skilled in the art would appreciate that similar cutting reels or equivalent implements with either a different number of blades and/or different degree of end to end rotation could be used.

Figure 5A:
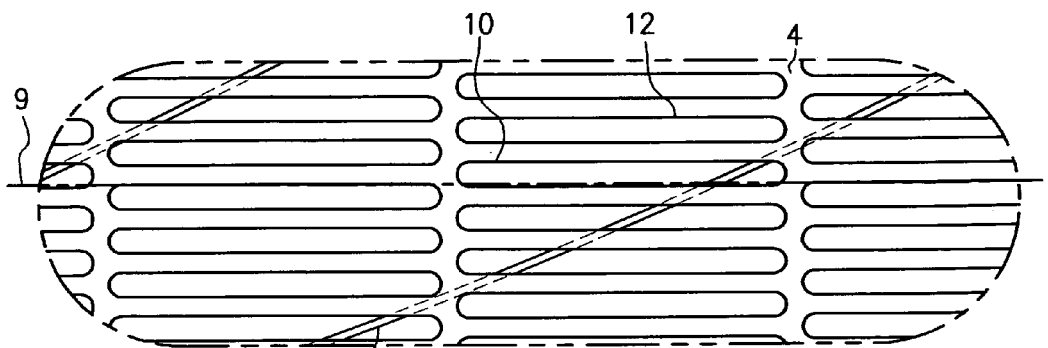
FIGS. 5A, 5B, and 5C are three direct facing perspective views of the interface of the slotted drum with the cutting reel showing a representative view of the movement of selected cutting blades across the slotted drum illustrating how the shear point moves along a tangent line which extends between the cutting reel blades and the slotted drum.
Figure 5B:
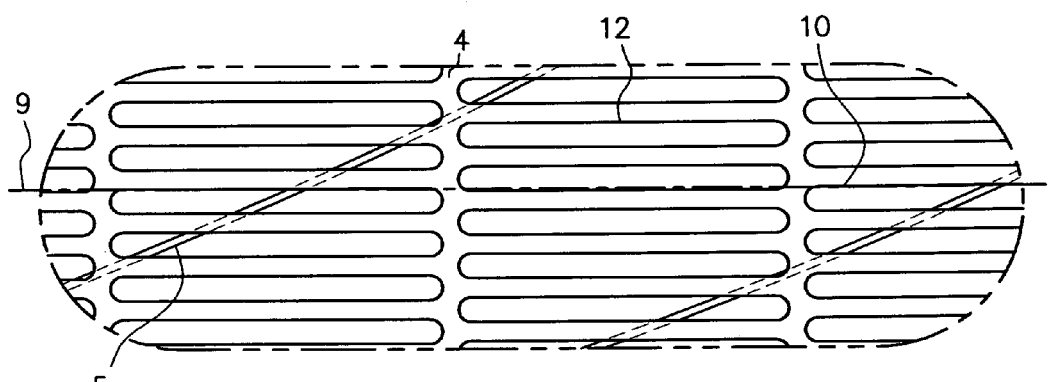
Figure 5C:
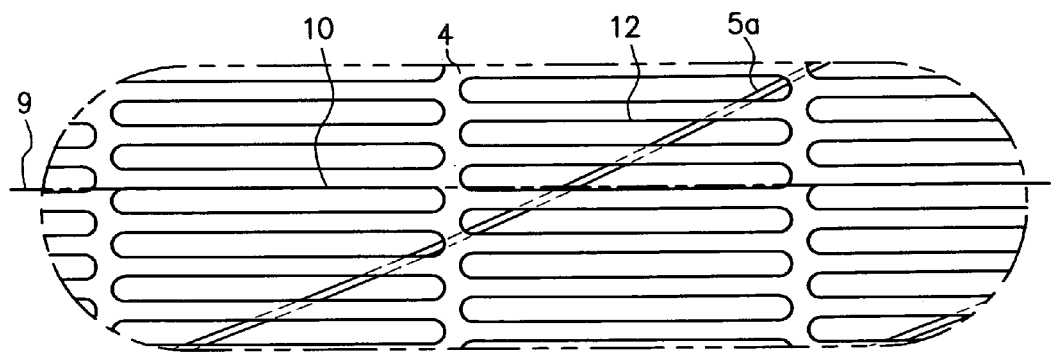
Figures 6, 6A:
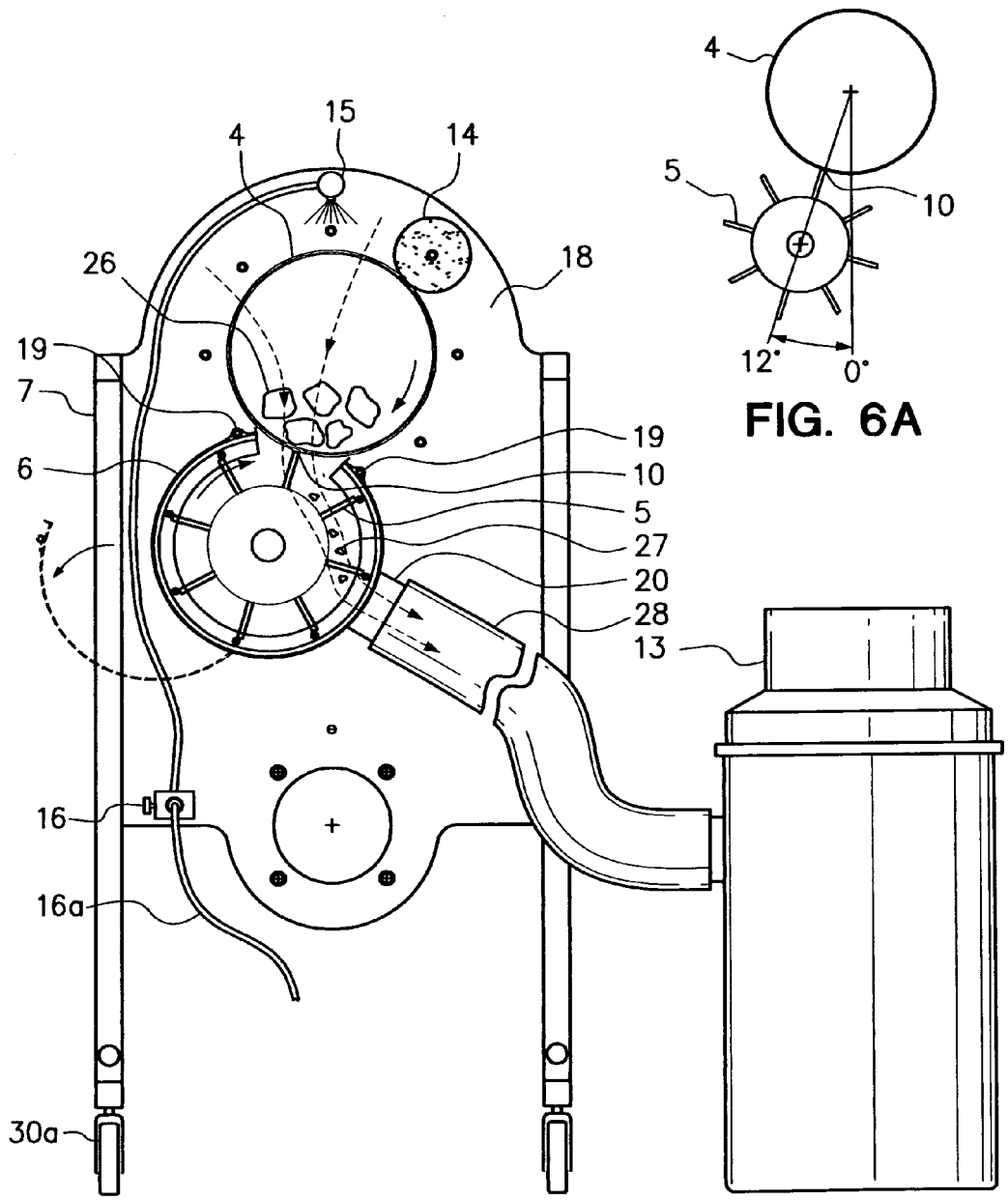
FIG. 6 is an end view of the apparatus showing the cleaning fluid sprayer system and the roller cleaning brush embodiments at the top, the slotted drum below them, the cutting reel below the slotted drum, the hinged vacuum manifold, a typical canister vacuum connected by a hose to the vacuum manifold, the frame and front end plate, and the path of airflow and plant trimmings (debris) through the invention.
FIG. 6A is an end view of the cutting interface embodiment showing the geometric relationship between slotted drum and cutting reel center lines.
Figure 8:
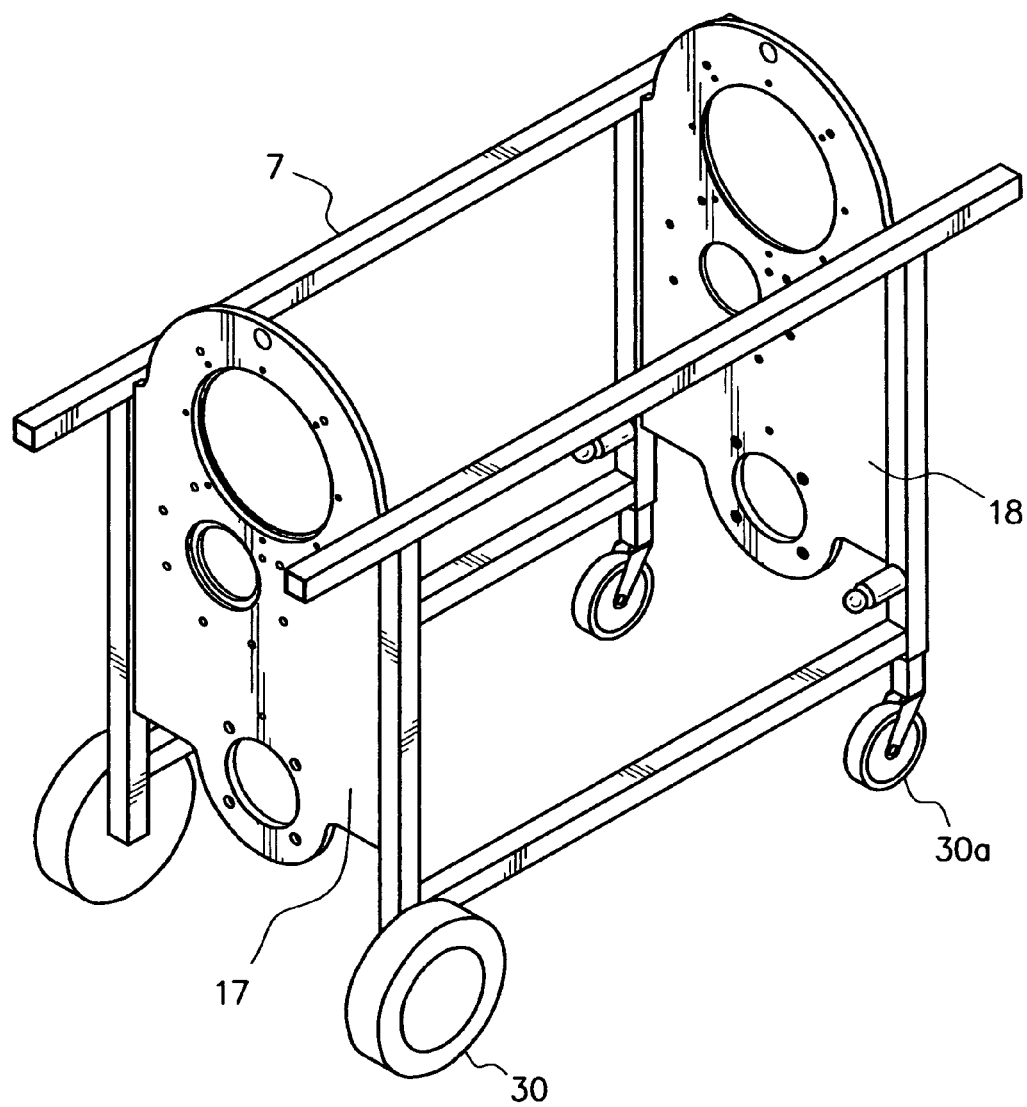
FIG. 8 is an isometric, perspective view of the metal frame embodiment with the two end plates (front and rear) that hold the bearings for the slotted drum, the circular bearing mounts for the cutting real, the electric motors for driving the slotted drum and cutting reel, the cover plates for the drive belts, and the wheels.

The example of the progressing cutting tangent line 9 shown in FIGS. 5A through 5C has a typical offset of 12 degrees from the bottom of the slotted drum as shown in FIGS. 6 and 6A. However, one skilled in the art would appreciate that the degree of offset of the cutting tangent line from the bottom of the slotted drum could vary depending upon a variety of factors such as how many blades are in the cutting reel, the degree of rotation of the cutting blades from end to end, and the speed of operation of the slotted drum and cutting reel.

The example of a roller brush 14 and cleaning liquid sprayer system 15 with fluid shut off valve 16 and fluid input line 16a for cleaning the slotted drum is given in FIG. 1, FIG. 1A, FIG. 2, FIG. 2A, and FIG. 6. However, one skilled in the art would appreciate that similar roller brushes with different diameters or made from different bristles and similar liquid sprayers with different spacing, configuration, control valve, and nozzle can be used.

The example of a hinged manifold 6 in FIG. 7A, FIG. 7B, and FIG. 7C shows a manifold that uses spring-biased pins 19 to hold it in place and a hinge 29 that allows one side of the manifold 6 to be opened while in place. However, one skilled in the art would appreciate that the manifold can have a different shape, a different or no hinge mechanism, and/or a different means of attachment to the apparatus (e.g., screws instead of spring loaded pins).

The example of a metal frame 7 as depicted in FIG. 1, FIGS. 1A through 1C, FIG. 2, FIG. 6, FIG. 8, and FIGS. 9A and 9B shows a frame made from square metal stock with a fixed height and larger wheels on one end and smaller wheels with a height adjustment mechanism on the other end. However, one skilled in the art would appreciate that the frame 7 can be made from rectangular or tubular stock of different metals, plastics and/or carbon composition material, and further, that differently sized wheels 30 and 30a and a different height adjustment mechanism 21 for lowering the frame on one end can be used.

The example of an adjustable bearing mount 22 in FIG. 10A and FIG. 10B and FIGS. 11A through 11D shows an adjustable bearing system that allows for precision adjustment of the distance of the cutting reel blades 5a from the slotted drum 4. However, one skilled in the art will appreciate that a different bearing adjustment mechanism to control the cutting distance could be used.

It will be appreciated that the apparatus may further vary as to configuration and as to details of the parts, and that the method may vary as to details and the order of the steps, without departing from the basic concepts as disclosed herein.

DESCRIPTION OF TYPICAL OPERATION

Figure 1B:
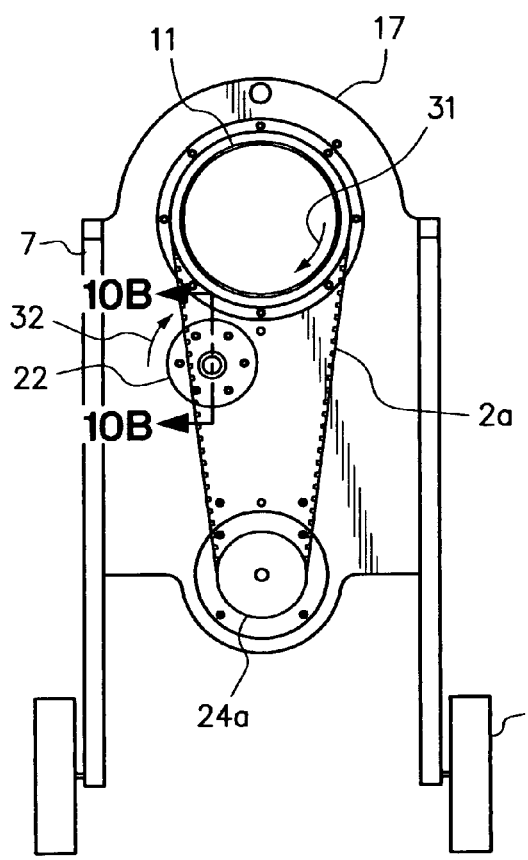
FIG. 1B is a view of the front of the overall apparatus shown without the cover for the timing belt and pulleys that drive the slotted drum.
Figure 1C:
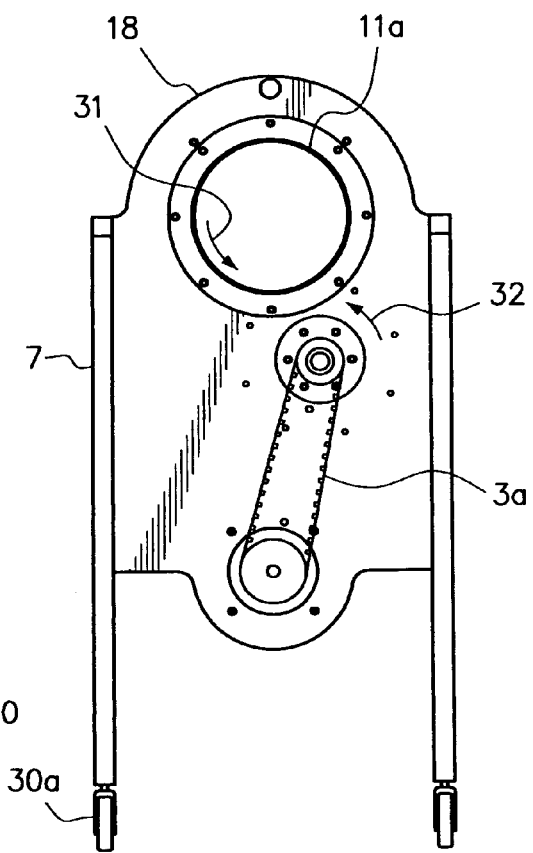
FIG. 1C is a view of the rear of the overall apparatus shown without the cover for the timing belt and pulleys that drive the cutting reel.
Figure 2:
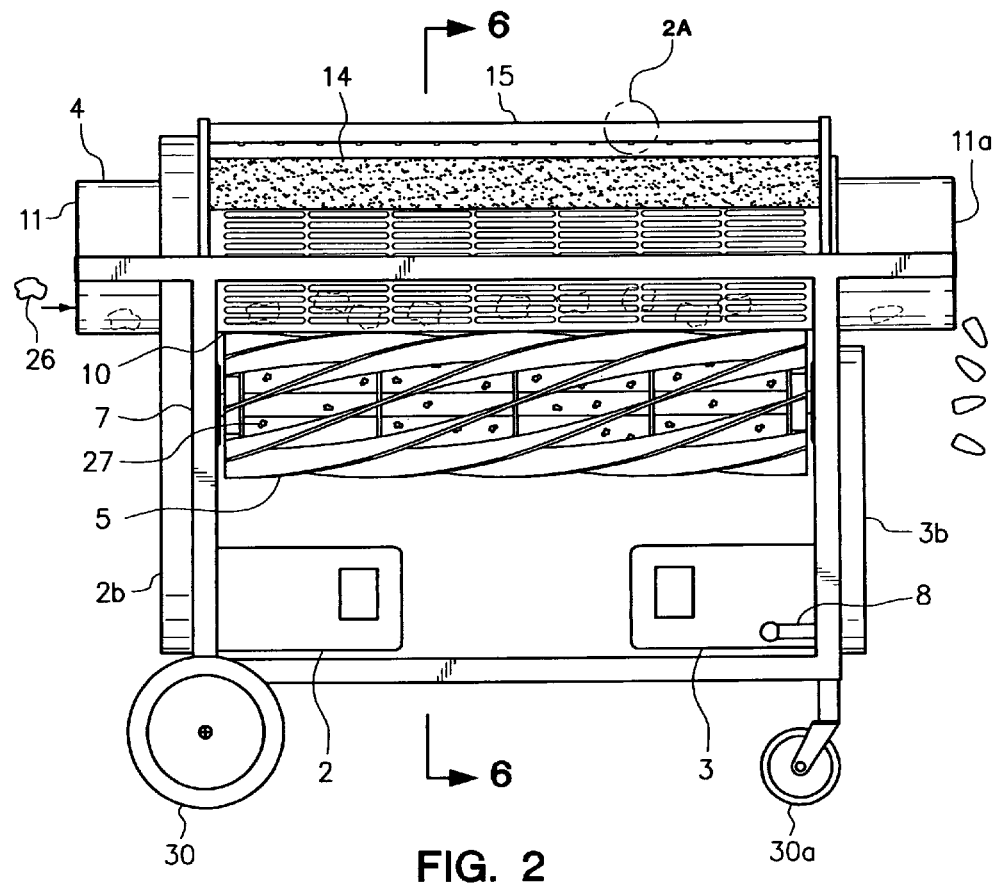
FIG. 2 is a side view representation showing an embodiment of the overall apparatus, including the direction of flow of the plant material through the apparatus.
Figure 2A:
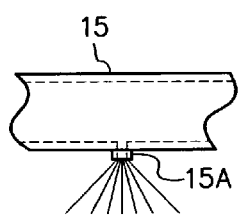
FIG. 2A is an exploded view of one of the sprayers on the spraying system.
Figure 9A:
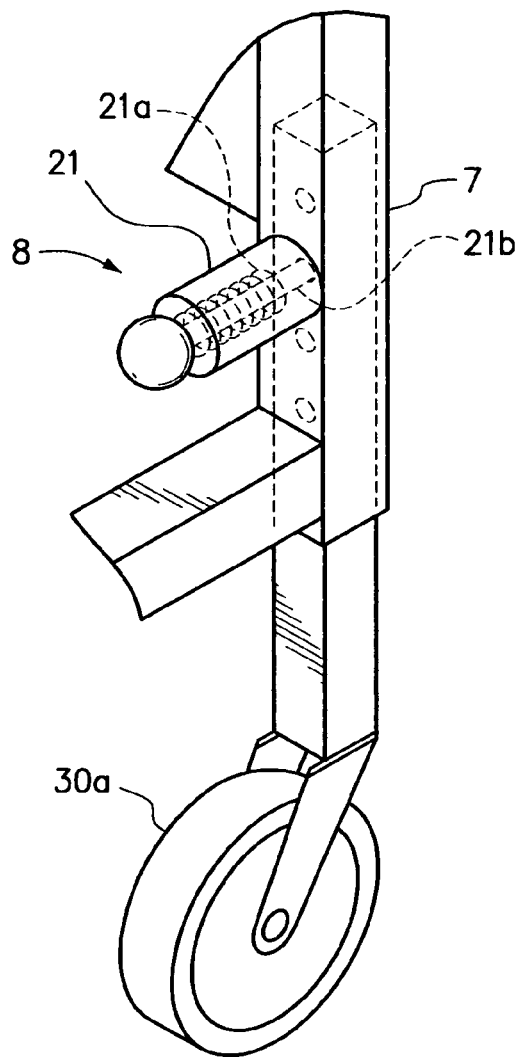
FIGS. 9A and 9B are close up, isometric views of the adjustable spring pin embodiment on the bottom of the back leg of the metal frame that allows height adjustment of the frame to allow for more gravity induced material flow.
Figure 9B:
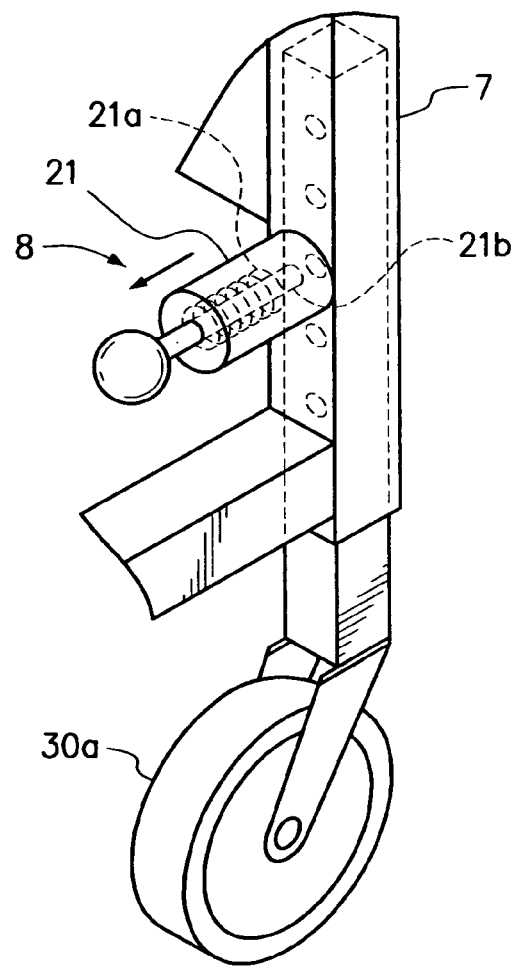
Figure 10A:
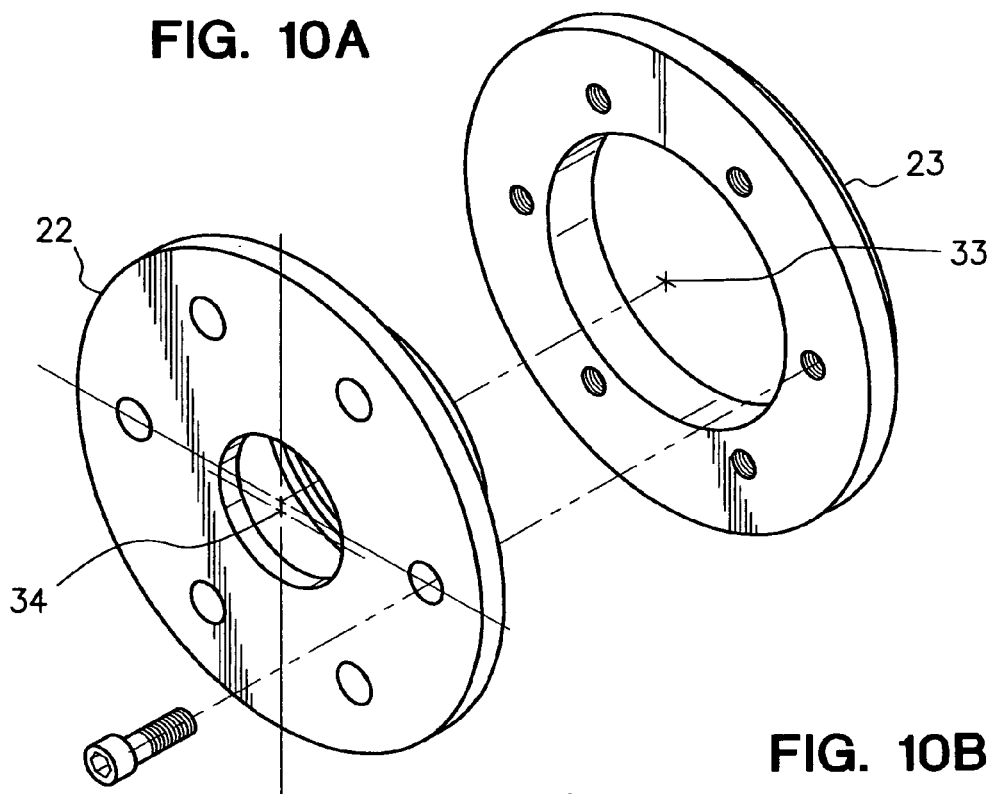
FIG. 10A is an isometric, perspective view of the adjustable bearing mount embodiment that holds the end of the cutting reel showing the small offset of the hole that holds the press fitted bearing from true center.
Figure 10B:
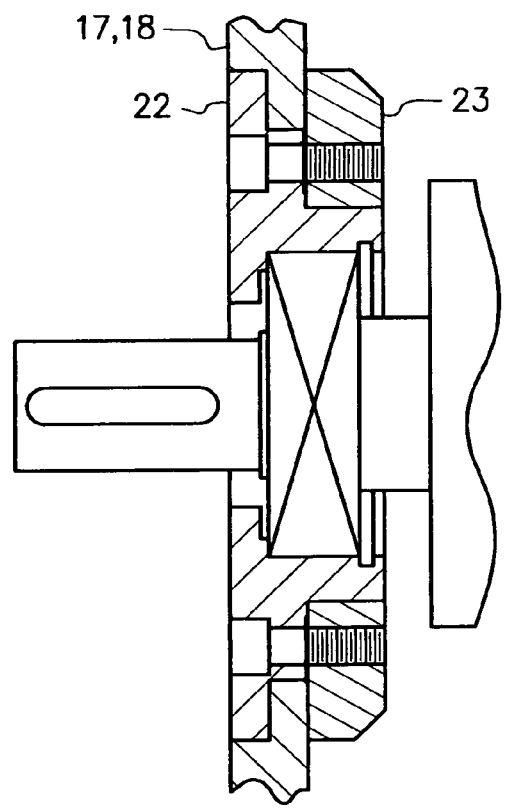
FIG. 10B is a cutaway side view of the adjustable bearing mount embodiment taken along section line 10B-10B of FIG. 10A with the front or rear frame mounting plate sandwiched between the adjustable bearing mount and its clamping plate on the reverse side of the front or rear frame mounting plate.
Figure 11A:
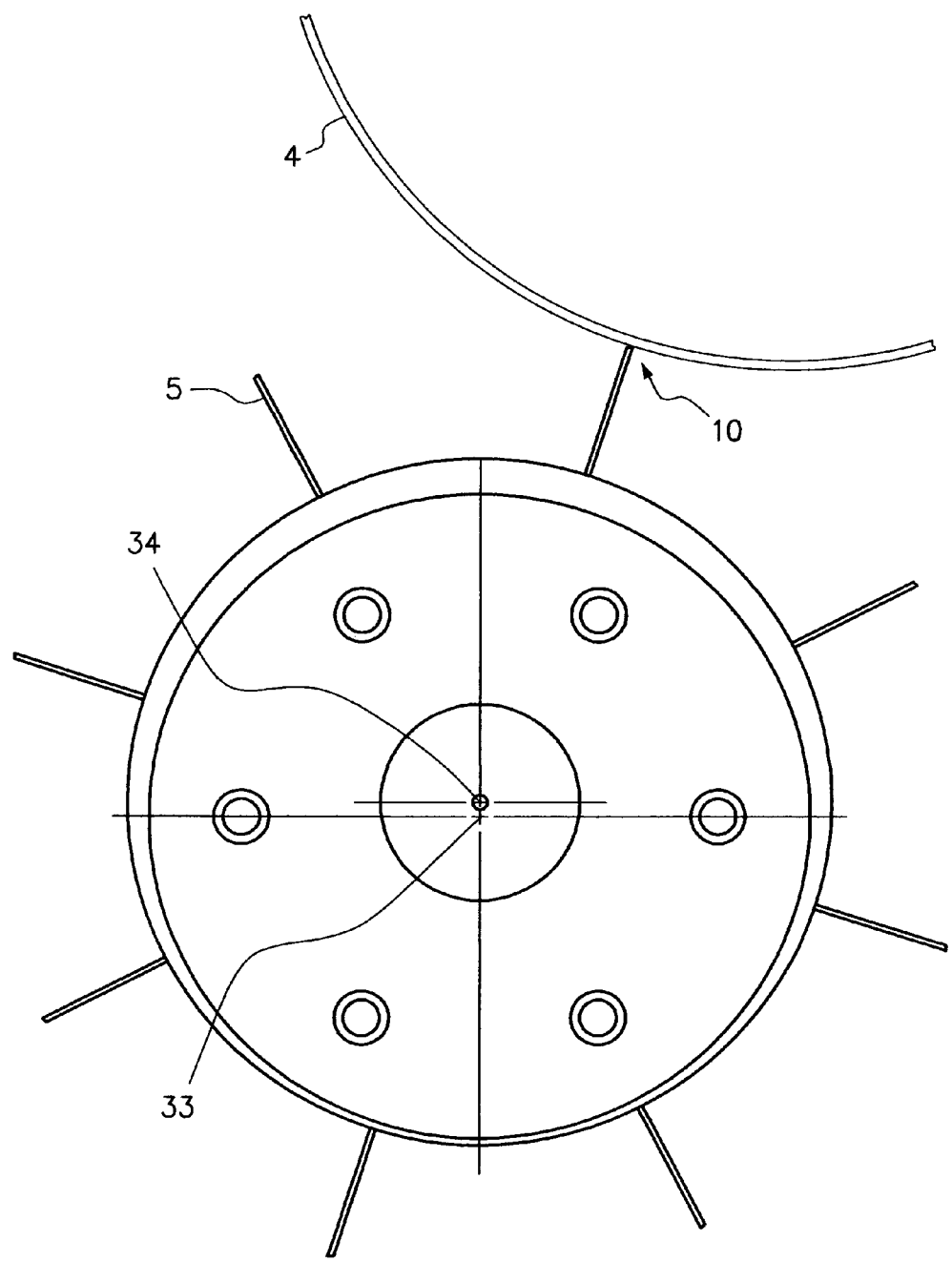
FIGS. 11A, 11B, 11C and 11D are end views of the adjustable bearing mount embodiment for the cutting reel showing an adjustable bearing mount rotated 90 degrees from the previous figure to show the location of the eccentric offset of the centerline of the bearing and the corresponding variance in distance between the edge of a cutting blade and the bottom of the slotted drum.
Figure 11B:
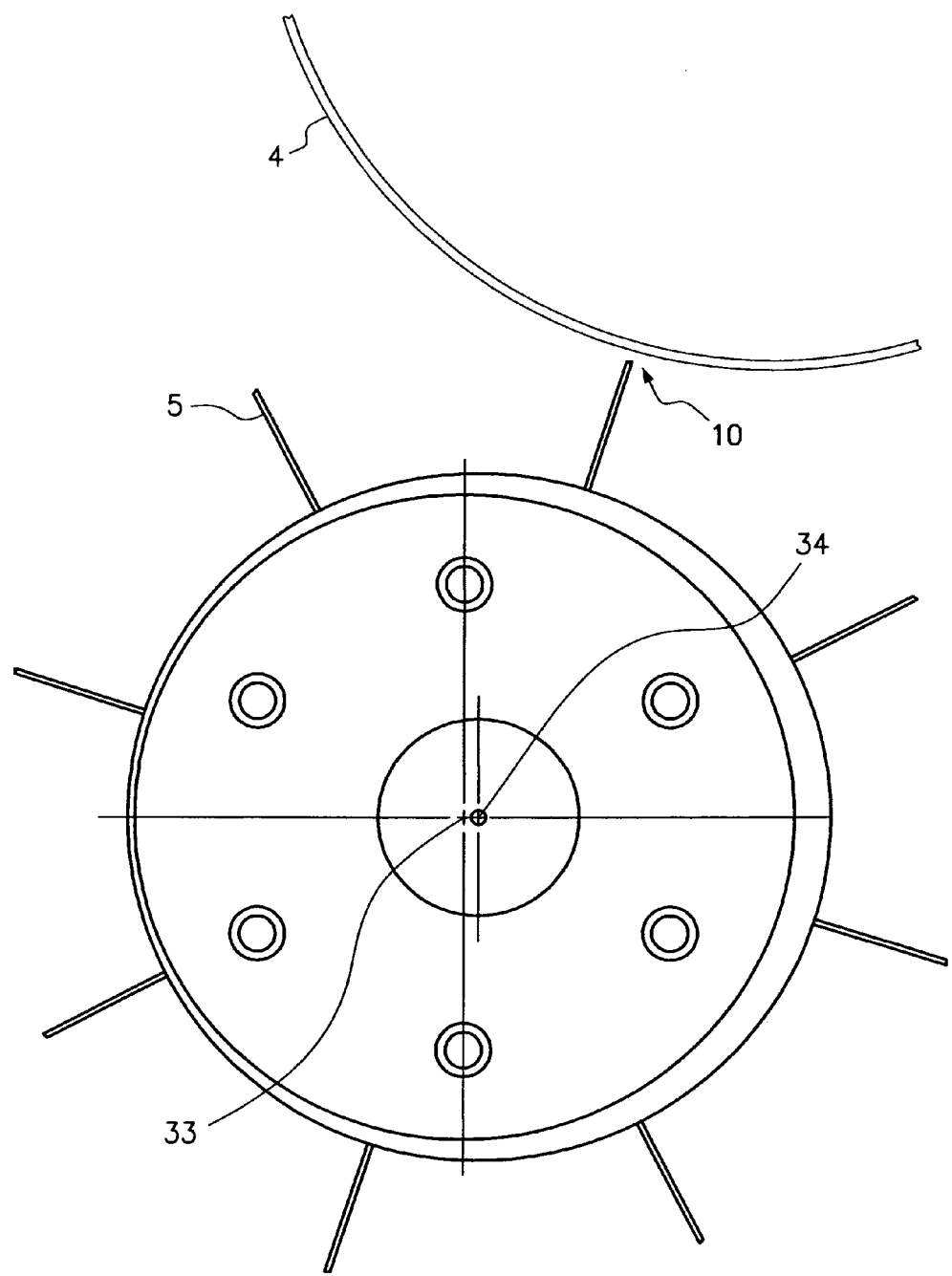
Figure 11C:
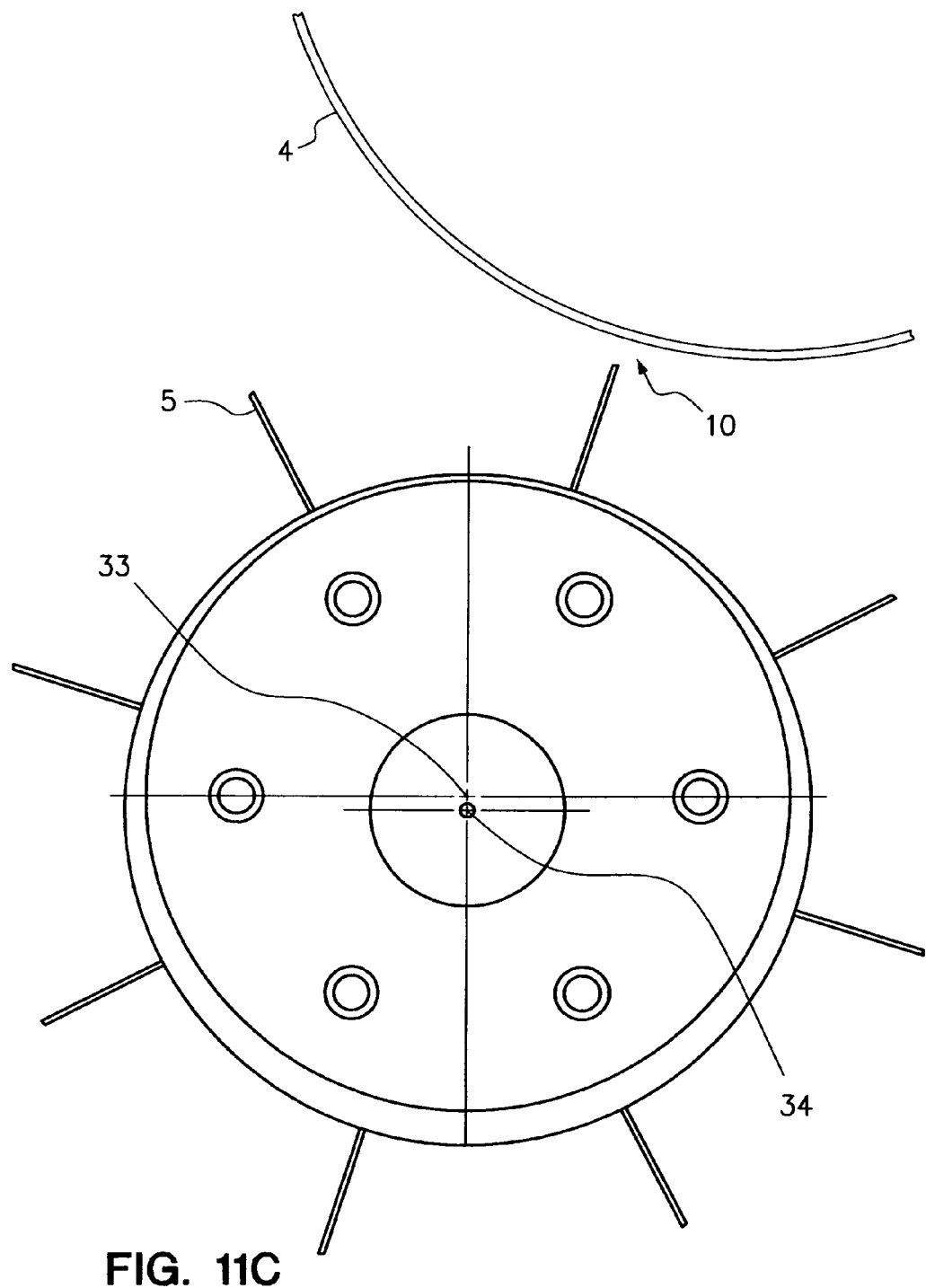
Figure 11D:
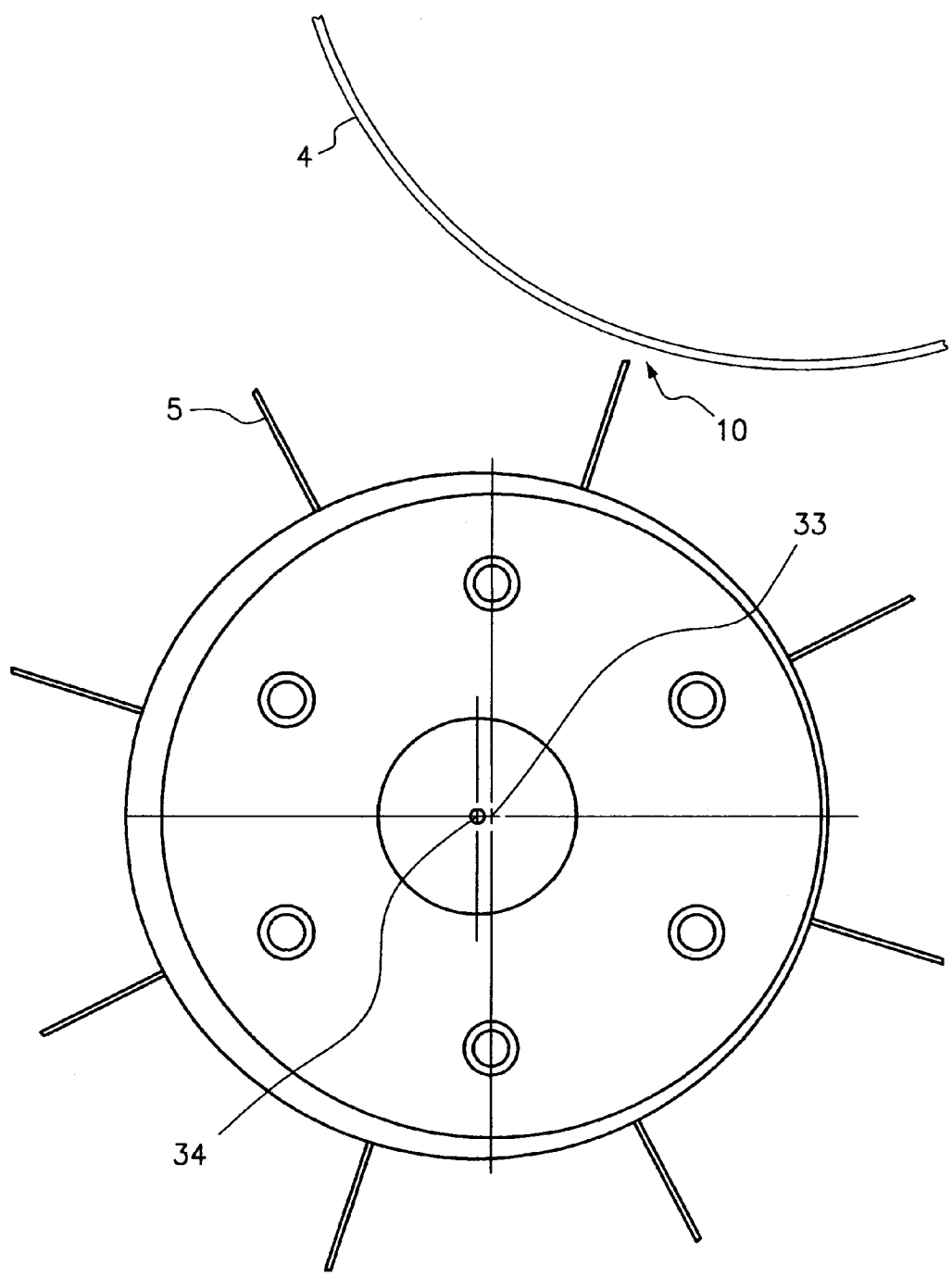

Referring to FIG. 1, FIGS. 1A-1C, FIG. 2, and FIG. 6, the plant trimming system is set out pictorially. The system is used by turning on the single pole on/off power switch 1 which sends power to the 110 vac single phase motors 2 and 3 as illustrated in FIG. 1. Motor 2 causes slotted drum 4 (see FIG. 3, FIGS. 3A-3C, & FIGS. 5A-5C for detail of slotted drum 4) to turn clockwise as represented by arrow-headed curved line 31 (when viewed from the front) at a typical speed of 60-70 rpm by means of drive belt 2a (as illustrated in FIG. 1B and FIG. 6), and motor 3 causes cutting reel 5 to turn clockwise as represented by arrow-headed curved line 32 at a typical speed of 1800-2800 rpm by means of drive belt 3a as represented by and illustrated in FIG. 1C and FIG. 6. [Note: Referring to FIG. 1, indicium 2b denotes the cover for drive belt 2a and indicium 3b denotes the cover for drive belt 3a.] The differential rotation [note: there is a differential in rotation between slotted drum 4 and cutting reel 5 because they are rotating in the same direction], combined with the vacuum inside the vacuum manifold 6 (as shown in FIG. 6 and FIG. 7), the force of gravity (which is increased if the frame 7 is lowered on the rear end by height adjustment mechanism 8, as also illustrated in FIGS. 9A and 9B), and the movement of the blades 5a on the cutting reel 5 across the cutting interface 10 causes the plant material to migrate from the entrance side 11 of slotted drum 4 towards the exit side 11a of slotted drum 4 (see FIG. 2 showing the migration of plant material 26 through slotted drum 4).

Referring to FIG. 1, FIG. 3, FIG. 4, FIGS. 5A-5C, and FIG. 6, as the plant material 26 migrates as generally depicted in FIG. 2 through slotted drum 4 from the front end (entrance) 11 to the rear end (exit) 11a, gravity and the vacuum from the vacuum manifold 6 pulls longer leaves, stems and other unwanted plant parts, i.e. the plant waste 27, through an individual slot 12 into the cutting interface 10 as generally depicted in FIG. 6. At the cutting interface 10 the cutting reel 5 slices off such plant parts along the cutting tangent line 9 (as shown in FIGS. 5A-5C) as a blade 5a on the cutting reel 5 comes into contact with and then shears off plant material 26 pressed against the edge of a slot 12 in slotted drum 4 (as shown in FIG. 6). The plant waste 27 is then swept up by the vacuum manifold 6 and exhausted through the exit holes 20 (see FIGS. 6 and 7A) in the vacuum manifold 6 through a flexible hose 28 to whatever type of trap or waste collector 13 is desired. Referring to FIG. 6, the dotted lines with arrows indicate the direction of the force of gravity and airflow on the plant material 26 inside slotted drum 4 and then, after the excess plant material 26 is removed at the cutting interface 10, the flow of the plant waste 27 through the vacuum manifold into a hose 28 and finally into a waste collector 13.

Referring to FIGS. 1, 1B, 2, and 6 the roller cleaning brush 14 is always engaged against the slotted drum 4 to brush away plant waste. The operator may also choose to turn on the cleaning system sprayer 15 using valve 16. This will cause cleaning fluid (typically water) to be drawn through fluid supply line 16a and then sprayed through the nozzles(s) 15a on the cleaning system sprayer 15 onto the slotted drum 4 ahead of where the roller cleaning brush 14 contacts the slotted drum 4. The amount of fluid through the cleaning system sprayer 15 that goes onto the top of slotted drum 4 can be controlled by adjusting valve 16.

Referring to FIGS. 1, 6, 7A-7C, and 8, the vacuum manifold 6 is installed for most operations. The vacuum manifold 6 is attached to the two end plates 17 and 18 by means of the spring-loaded pins 19 (see FIGS. 6, 7A and 7B). The vacuum manifold has one or more exit holes 20 (as best shown in FIGS. 6 and 7A) to which the operator may attach a hose 28 (see FIG. 6) to carry away the plant waste 27. The vacuum manifold 6 is cleaned by removing it from the apparatus. This also enables the cutting reel 5 to be cleaned and/or sharpened (and removed if and as needed).

Referring to FIG. 2 and FIGS. 9A and 9B, the frame 7 can be adjusted from a horizontal level to several inches lower on the exit side by using the height adjustment mechanism 8 which is operated by pulling on adjustment pin mechanism 21 which is comprised of a spring 21*a* and a pin 21*b*.

Referring to FIGS. 10A-10B, and FIGS. 11A-11D, the distance between the cutting reel 5 and the slotted drum 4, i.e., the cutting interface 10, can be adjusted by rotating the adjustable bearing mount 22 in relation to clamp plate 23 on the front and rear of the apparatus. By rotating bearing mount 22 in relation to clamp plate 23, the centerline 34 of the cutting reel 5 is moved around the center 33 of the clamp plate 23 (see FIGS. 11A through 11D). This operation is done on bearing mount 22 on each end of the apparatus. Typically, the cutting interface 10 between the cutting reel 5 blade edges and the slotted drum 4 is set for about 0.003 inches, with a typical range of 0.002 to 0.006 inches. However, the cutting interface 10 may be adjusted to optimize operation with differing plant material 26.

Other aspects and embodiments of the plant trimming apparatus comprise any one or more feature(s) disclosed herein in combination with any one or more other feature(s) or a variant or equivalent thereof. In any of the embodiments described herein, any one or more features may be omitted altogether or replaced or substituted by another feature disclosed herein or a variant or equivalent thereof.

Numerous modifications and changes to the embodiments described above will be apparent to those skilled in the art.

The invention claimed is:

1. A plant trimmer for trimming materials from plants comprising:
   (a) a frame having front and rear mounting plates;
   (b) a rotatable slotted drum, said slotted drum open on both ends and supported by said mounting plates, said slotted drum for receiving plant material in one end and delivering plant material from the other end;
   (c) a rotatable cutting implement mounted parallel to the exterior of said slotted drum and supported by said mounting plates, said cutting implement for shearing unwanted plant parts projecting through the slots in said slotted drum;
   (d) adjustable bearing mounts holding said cutting implement on each end of said cutting implement, said adjustable bearing mounts attached to said front and said rear mounting plates of said frame with a clamp that allows said adjustable bearing mounts to be adjusted and then locked in place, thereby enabling the position of said cutting implement to be raised and lowered in relation to said slotted drum, thus enabling the adjustment of a cutting interface between said slotted drum and said cutting implement;
   (e) a manifold enclosing said cutting implement except for the cutting interface between said slotted drum and said cutting implement, said manifold for (i) directing a vacuum on the plant material in said slotted drum for pulling the unwanted plant parts through the slots in said slotted drum to be cut on the outside of said slotted drum by said cutting implement and (ii) moving the desired plant parts from one end of said slotted drum to the other end of said slotted drum;
   (f) a motor supported by one of said frame and said mounting plates and coupled to said slotted drum enabling rotation thereof;
   (g) a motor mounted on the other of said frame and said mounting plates and coupled to said cutting implement enabling rotation thereof; and
   (h) a switch that simultaneously powers and regulates the operation and speed of both said motors.

2. The plant trimmer as claimed in claim 1, wherein said cutting implement comprises a cutting reel.

3. The plant trimmer as claimed in claim 1 wherein said adjustable bearing mounts comprise: a bearing mounting plate, said bearing mounting plate made with a small offset from center for the placement of the bearing for holding said cutting reel; said bearing mounting plate being held in place by means of a rotatable clamp on the opposite side of said front or rear mounting plates of said frame; said adjustable bearing mounts being able to be un-clamped, rotated, and then re-clamped for the purpose of causing the slightly offset bearing to be closer to, or further from, the centerline of said slotted drum, thereby allowing for the adjustment of the cutting interface between said slotted drum and said cutting reel.

4. The plant trimmer as claimed in claim 1, wherein said cutting implement comprises a cutting reel, and further including a roller brush located parallel to, and in contact with, said slotted drum and held in place between said front and rear mounting plates of said frame by bearings.

5. The plant trimmer as claimed in claim 4, wherein said roller brush is held in place by bearings that can be adjusted in location so that the distance and pressure between said roller brush and said slotted drum can be adjusted for optimal cleaning of said slotted drum.

6. The plant trimmer as claimed in claim 1, wherein said cutting implement comprises a cutting reel, and further including a liquid sprayer located parallel to said slotted drum between said front and rear mounting plates of said frame.

7. The plant trimmer as claimed in claim 6, wherein said liquid sprayer includes a valve which is actionable to adjust the flow of liquid from off to full pressure for optimal cleaning of said slotted drum.

8. The plant trimmer as claimed in claim 1, wherein said frame includes front and rear ends and a height adjustment mechanism on one of said ends to allow said frame to slant downwards towards the other of said ends.

9. The plant trimmer as claimed in claim 1, wherein said frame includes front and rear ends and pairs of wheels respectively on said front and rear ends to allow said plant trimmer to be rolled from location to location.

10. A method for trimming materials from a plant comprising the steps of:
    (a) rotating a slotted drum and a cutting implement in the same direction, but at different speeds, said slotted drum and said cutting implement mounted in parallel and at close distance to create a cutting interface, said cutting implement held parallel to said slotted drum by adjustable bearing mounting plates,
    (b) applying a vacuum to a manifold enclosing said cutting implement to pull unwanted plant material through the slots in said slotted drum and to move wanted plant material from one end (entrance) of said slotted drum to the other end (exit) of said slotted drum;
    (c) inserting plant material into one end (entrance) of the slotted drum; and
    (d) activating the switch controlling motors that rotate both said slotted drum and said cutting implement, thereby, enabling unwanted plant material to be trimmed from the wanted plant material.

11. The method according to claim 10 further comprising the step of adjusting said cutting interface between said slotted drum and said cutting implement by un-clamping, rotating, and then re-clamping said adjustable bearing mounting plates, said adjustable bearing mounting plates having a small offset from center for the placement of the bearing for holding said cutting implement, thereby allowing for the adjustment of the said cutting interface between said slotted drum and said cutting implement.

12. The method according to claim 10 further comprising the step of cleaning said slotted drum with a roller brush located parallel to, and in contact with, said slotted drum.

13. The method according to claim 10 further comprising the step of cleaning said slotted drum with a liquid sprayer coupled to a source of cleansing liquid and located parallel to said slotted drum.

14. The method according to claim 10 further comprising the step of adjusting the slant of said slotted drum from horizontal to lower on one end of said slotted drum by using a height adjustment mechanism on one end of the frame holding said slotted drum.

* * * * *